US007069282B2

(12) United States Patent
Rizzotto et al.

(10) Patent No.: US 7,069,282 B2
(45) Date of Patent: Jun. 27, 2006

(54) METHOD OF PERFORMING THE SUPERPOSITION OPERATION OF A GROVER'S OR A DEUTSCH-JOZSA'S QUANTUM ALGORITHM AND A RELATIVE QUANTUM GATE

(75) Inventors: Gianguido Rizzotto, Civate (IT); Paolo Amato, Limbiate (IT); Domenico Porto, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 855 days.

(21) Appl. No.: 10/167,058

(22) Filed: Jun. 11, 2002

(65) Prior Publication Data

US 2003/0149511 A1 Aug. 7, 2003

(30) Foreign Application Priority Data

Jun. 2, 2001 (EP) .................................. 0830383

(51) Int. Cl.
*G06F 15/00* (2006.01)
*G02F 3/00* (2006.01)
(52) U.S. Cl. ...................................... 708/200; 359/107
(58) Field of Classification Search ................ 708/200, 708/191; 359/107, 108
See application file for complete search history.

(56) References Cited

U.S. PATENT DOCUMENTS 6,301,029 B1 * 10/2001 Azuma ....................... 359/107
6,678,450 B1 * 1/2004 Franson ...................... 385/122

FOREIGN PATENT DOCUMENTS

EP 1083520 3/2001

OTHER PUBLICATIONS

Hioe et al., A Single Flux Quantum Logic Gate with High Functionality, Superconductor Science and Technology Publishing, Techno House, Bristol, GB, vol. 4, No. 11, Nov. 1, 1991, pp. 658-661.
Barenco et al., Elementary Gates for Quantum Computation, Physical Review, General Physics, American Institute of Physics, New York, vol. 52, No. 5, pp. 3457-3467.
Miquel et al., Factoring in a Dissipative Quantum Computer, Physical Review, (Atomic, Molecular, and Optical Physics), Oct. 1996, APR through AIP, USA, vol. 54, No. 4, pp. 2605-2613.
Vedral et al., Basics of Quantum Computation, Progress in Quantum Electronics, 1998, Elsevier, UK, vol. 22, No. 1, pp. 1-39.

* cited by examiner

*Primary Examiner*—Chuong D Ngo
(74) *Attorney, Agent, or Firm*—Lisa K. Jorgenson; Allen, Dyer, Doppelt, Milbrath & Gilchrist, P.A.

(57) ABSTRACT

A quantum gate performs the superposition operation of a Grover's or of a Deutsch-Jozsa's quantum algorithm in a very fast manner. This is done by performing all multiplications by using logic gates that immediately outputs the result. The superposition operation includes performing the Hadamard rotation over an input set of vectors for producing a set of rotated vectors, and calculating the tensor product of all the rotated vectors for outputting a linear superposition set of vectors. The tensor product of all the rotated vectors is carried out by the logic gates.

27 Claims, 6 Drawing Sheets

FIG. 9.

METHOD OF PERFORMING THE SUPERPOSITION OPERATION OF A GROVER'S OR A DEUTSCH-JOZSA'S QUANTUM ALGORITHM AND A RELATIVE QUANTUM GATE

FIELD OF THE INVENTION

The present invention relates to quantum algorithms, and in particular, to a method of superpositioning a Grover's or a Deutsch-Jozsa's quantum algorithm and a relative hardware quantum gate.

BACKGROUND OF THE INVENTION

Quantum algorithms are global random searching algorithms based on quantum mechanics, laws, and quantum effects. They are used for controlling a process or for processing data in a database, and more specifically, to control a process and/or including search-of-minima intelligent operations.

In a quantum search algorithm, each design variable is represented by a finite linear superposition of classical initial states with a sequence of elementary unitary steps manipulating the initial quantum state |i> (for the input) such that a measurement of the final state of the system yields the correct output. Usually, three principle operators, i.e., linear superposition (coherent states), entanglement and interference are used in the quantum search algorithm.

For a better comprehension on the field of application of the present invention, a brief description of quantum search algorithms is provided below.

Overview on Quantum Algorithms

The problems solved by quantum algorithms may be stated as follows:

| Input | A function $f: \{0,1\}^n \rightarrow \{0,1\}^m$ |
|---|---|
| Problem | Find a certain property of $f$. |

The structure of a quantum algorithm is outlined by a high level representation in the schematic diagram of FIG. 1. The input of a quantum algorithm is a function f from binary strings into binary strings. This function is represented as a map table, defining for every string its image. The function f is first encoded into a unitary matrix operator $U_F$ depending on f properties. This operator calculates f when its input and output strings are encoded into canonical basis vectors of a Complex Hilbert Space: $U_F$ maps the vector code of every string into the vector code of its image by f.

BOX 1: UNITARY MATRIX $U_F$

A squared matrix $U_F$ on the complex field is unitary if its inverse matrix coincides with its conjugate transpose:

$$U_F^{-1} = U_F^t$$

A unitary matrix is always reversible and preserves the norm of vectors.

When the matrix operator $U_F$ has been generated, it is embedded into a quantum gate G, which is a unitary matrix whose structure depends on the form of matrix $U_F$ and on the problem we want to solve. The quantum gate is the heart of a quantum algorithm. In every quantum algorithm, the quantum gate acts on an initial canonical basis vector (the same vector can always be chosen) to generate a complex linear combination (i.e., a superposition) of basis vectors as the output. This superposition contains all the information to answer the initial problem.

After the superposition has been created, a measurement takes place to extract this information. In quantum mechanics, the measurement is a non-deterministic operation that produces as output only one of the basis vectors in the entering superposition. The probability of every basis vector being the measurement output depends on its complex coefficient (probability amplitude) in the entering complex linear combination.

The segmental action of the quantum gate and of the measurement forms the quantum block. The quantum block is repeated k times to produce a collection of k basis vectors. Since the measurement is a non-deterministic operation, these basic vectors will not be necessarily identical and each one of them will encode a piece of the information needed to solve the problem.

The last part of the algorithm includes the interpretation of the collected basis vectors in order to get the right answer for the initial problem with a certain probability.

Encoder

The behavior of the encoder block is described in the detailed schematic diagram of FIG. 2. The function f is encoded into matrix $U_F$ in three steps.

Step 1

The map table of the function $f: \{0,1\}^n \rightarrow \{0,1\}^m$ is transformed into the map table of the injective function $F: \{0,1\}^{n+m} \rightarrow \{0,1\}^{n+m}$ such that:

$$F(x_0, \ldots, x_{n-1}, y_0, \ldots, y_{m-1}) = (x_0, \ldots, x_{n-1}, f(x_0, \ldots, x_{n-1}) \oplus (y_0, \ldots, y_{m-1})) \quad (2)$$

The need to deal with an injective function comes from the requirement that $U_F$ is unitary. A unitary operator is reversible, so it can not map 2 different inputs in the same output. Since $U_F$ will be the matrix representation of F, F is supposed to be injective. If we directly used the matrix representation of the function f, we could obtain a non-unitary matrix since f could be non-injective. Injectivity is thus fulfilled by increasing the number of bits and considering the function F instead of the function f. The function f can always be calculated from F by putting $(y_0, \ldots, y_{m-1}) = (0, \ldots, 0)$ in the input string and reading the last m values of the output string.

BOX 2: XOR OPERATOR $\oplus$

The XOR operator between two binary strings $p$ and $q$ of length $m$ is a string $s$ of length $m$ such that the $i$-th digit of $s$ is calculated as the exclusive OR between the $i$-th digits of $p$ and $q$:

$$p = (p_0, \ldots, p_{n-1})$$
$$q = (q_0, \ldots, q_{n-1})$$
$$s = p \oplus q = ((p_0 + q_0) \bmod 2, \ldots, (p_{n-1} + q_{n-1}) \bmod 2))$$

Step 2

The function F map table is transformed into a $U_F$ map table based upon the following constraint:

$$\forall s \in \{0,1\}^{n+m}: U_F[\tau(s)] = \tau[F(s)] \quad (3)$$

The code map $\tau: \{0,1\}^{n+m} \to c^{2^{n+m}}$ ($c^{2^{n+m}}$ is the target Complex Hilbert Space) is such that:

$$\tau(0) = \begin{pmatrix} 1 \\ 0 \end{pmatrix} = |0\rangle \quad \tau(1) = \begin{pmatrix} 0 \\ 1 \end{pmatrix} = |1\rangle$$

$$\tau(x_0, \ldots, x_{n+m-1}) = \tau(x_0) \otimes \ldots \otimes \tau(x_{n+m-1}) = |x_0 \ldots x_{n+m-1}\rangle$$

Code $\tau$ maps bit values into complex vectors of dimension 2 belonging to the canonical basis of $C^2$. Besides, using tensor product, $\tau$ maps the general state of a binary string of dimension n into a vector of dimension $2^n$. This reduces this state to the joint state of the n bits composing the register. Every bit state is transformed into the corresponding 2-dimesional basis vector, and then the string state is mapped into the corresponding $2^n$-dimesional basis vector by composing all bit-vectors through tensor products. In this sense a tensor product is the vector counterpart of state conjunction.

BOX 3: VECTOR TENSOR PRODUCT ⊗

The tensor product between two vectors of dimensions $h$ and $k$ is a tensor product of dimension $h \cdot k$, such that:

$$|x\rangle \otimes |y\rangle =$$

$$\begin{pmatrix} x_1 \\ \ldots \\ x_h \end{pmatrix} \otimes \begin{pmatrix} y_1 \\ \ldots \\ y_k \end{pmatrix} = \begin{pmatrix} x_1 y_1 \\ \ldots \\ x_1 y_k \\ \ldots \\ x_h y_1 \\ \ldots \\ x_h y_k \end{pmatrix} \Rightarrow$$

Physical interpretation:
If a component of a complex vector is interpreted as the probability amplitude of a system being in a given state (indexed by the component number), the tensor product between two vectors describes the joint probability amplitude of two systems being in a joint state.

EXAMPLES

Vector Tensor Products $$(0,0) \xrightarrow{\tau} \begin{pmatrix} 1 \\ 0 \end{pmatrix} \otimes \begin{pmatrix} 1 \\ 0 \end{pmatrix} = \begin{pmatrix} 1 \\ 0 \\ 0 \\ 0 \end{pmatrix} = |00\rangle \quad (0,1) \xrightarrow{\tau} \begin{pmatrix} 1 \\ 0 \end{pmatrix} \otimes \begin{pmatrix} 0 \\ 1 \end{pmatrix} = \begin{pmatrix} 0 \\ 1 \\ 0 \\ 0 \end{pmatrix} = |01\rangle$$

$$(1,0) \xrightarrow{\tau} \begin{pmatrix} 0 \\ 1 \end{pmatrix} \otimes \begin{pmatrix} 1 \\ 0 \end{pmatrix} = \begin{pmatrix} 0 \\ 0 \\ 1 \\ 0 \end{pmatrix} = |10\rangle \quad (1,1) \xrightarrow{\tau} \begin{pmatrix} 0 \\ 1 \end{pmatrix} \otimes \begin{pmatrix} 0 \\ 1 \end{pmatrix} = \begin{pmatrix} 0 \\ 0 \\ 0 \\ 1 \end{pmatrix} = |11\rangle$$

Basis vectors are denoted using the ket notation $|i\rangle$. This notation is taken from the Dirac description of quantum mechanics.

Step 3

The $U_F$ map table is transformed into $U_F$ using the following transformation rule:

$$[U_F]_{ij} = 1 \Leftrightarrow U_F|j\rangle = |i\rangle \quad (4)$$

This rule can easily be understood considering vectors $|i\rangle$ and $|j\rangle$ are column vectors. Since these vectors belong to the canonical basis, $U_F$ defines a permutation map of the identity matrix rows. In general, row $|i\rangle$ is mapped into row $|i\rangle$.

This rule will be illustrated in detail on the first example of a quantum algorithm, such as Grover's algorithm.

Quantum Block

The heart of the quantum block is the quantum gate, which depends on the properties of the matrix $U_F$. The scheme in FIG. 3 gives a more detailed description of the quantum block. The matrix operator $U_F$ in FIG. 3 is the output of the encoder block represented in FIG. 2. Here, it becomes the input for the quantum block.

This matrix operator is first embedded into a more complex gate: the quantum gate G. The unitary matrix is applied k times to an initial canonical basis vector $|i\rangle$ of dimension $2^{n+m}$. Every time, the resulting complex superposition $G|0 \ldots 01 \ldots 1\rangle$ of basis vectors is measured, and one basis vector $|x_i\rangle$ is produced as a result. All the measured basis vectors $\{|x_1\rangle, \ldots, |x_k\rangle\}$ are collected together. This collection is the output of the quantum block.

The intelligence of such algorithms is in the ability to build a quantum gate that is able to extract the information necessary to find the required property of f, and to store it into the output vector collection. The structure of the quantum gate for every quantum algorithm will be discussed in detail, observing that a general description is possible. To represent quantum gates we are going to employ some special diagrams called quantum circuits.

An example of a quantum circuit, relative to the so called Deutsch-Jozsa's quantum algorithm, is illustrated in FIG. 4. Every rectangle is associated to a matrix $2^n \times 2^n$, where n is the number of lines entering and leaving the rectangle. For example, the rectangle marked $U_F$ is associated to matrix $U_F$.

Quantum circuits let us provide a high level description of the gate, and using some transformation rules which are listed in FIGS. 5A–5F, it is possible to compile them into the corresponding gate matrix.

It will be clearer how to use these rules when we discuss the first examples of a quantum algorithm.

BOX 4: MATRIX TENSOR PRODUCT ⊗

The tensor product between two matrices $X_{n \times m}$ and $Y_{h \times k}$ is a (block) matrix $(n \cdot h) \times (m \cdot k)$ such that:

$$X \otimes Y = \begin{bmatrix} x_{11}Y & \cdots & x_{1m}Y \\ \cdots & \cdots & \cdots \\ x_{n1}Y & \cdots & x_{nm}Y \end{bmatrix} \text{ with } X = \begin{bmatrix} x_{11} & \cdots & x_{1m} \\ \cdots & \cdots & \cdots \\ x_{n1} & \cdots & x_{nm} \end{bmatrix}$$

EXAMPLE

Matrix Tensor Product $$\begin{bmatrix} 1 & 2 \\ 3 & 4 \end{bmatrix} \otimes \begin{bmatrix} 5 & 6 \\ 7 & 8 \end{bmatrix} = \begin{bmatrix} 1 \cdot \begin{bmatrix} 5 & 6 \\ 7 & 8 \end{bmatrix} & 2 \cdot \begin{bmatrix} 5 & 6 \\ 7 & 8 \end{bmatrix} \\ 3 \cdot \begin{bmatrix} 5 & 6 \\ 7 & 8 \end{bmatrix} & 4 \cdot \begin{bmatrix} 5 & 6 \\ 7 & 8 \end{bmatrix} \end{bmatrix}$$

$$= \begin{bmatrix} 5 & 6 & 10 & 12 \\ 7 & 8 & 14 & 16 \\ 15 & 18 & 20 & 24 \\ 21 & 24 & 28 & 32 \end{bmatrix}$$

Decoder

The decoder block has the function to interpret the basis vectors collected after the iterated execution of the quantum block. Decoding these vectors means to retranslate them into binary strings and interpreting them directly if they already contain the answer to the starting problem or use them, for instance, as coefficient vectors for some equation system in order to get the searched solution. This part will not be discussed in detail because it is well known by those skilled in the art.

Because of the particular importance of the Grover's quantum algorithm in the realization of controllers, a brief description of the Grover's algorithm is given below.

Grover's Problem

Grover's problem is stated as follows:

| Input | A function $f: \{0, 1\}^n \to \{0, 1\}$ such that $\exists x \in \{0, 1\}^n: f(x) = 1 \land \forall y \in \{0, 1\}^n: x \neq y \Rightarrow f(y) = 0)$ |
|---|---|
| Problem | Find $x$ |

In Deutsch-Jozsa's algorithm there are two classes of input functions, and it must be determined what class the input function belongs to. In this case the problem is in some sense identical in its form, even if it is harder because now we are dealing with $2^n$ classes of input functions. Each function of the kind described forms a class.

The diagram of the Grover's algorithm is depicted in FIG. 6, and the gate equation is $$G=[(D_n \otimes I) \cdot U_F]^h \cdot (^{n+1}H)$$

Operator $D_n$ is called the diffusion matrix of order n and it is responsible for interference in this algorithm. This matrix is defined as follows:

| $D_n$ | $\|0..0>$ | $\|0..1>$ | ... | $\|i>$ | ... | $\|1..0>$ | $\|1..1>$ |
|---|---|---|---|---|---|---|---|
| $\|0..0>$ | $-1+1/2^{n-1}$ | $1/2^{n-1}$ | ... | $1/2^{n-1}$ | ... | $1/2^{n-1}$ | $1/2^{n-1}$ |
| $\|0..1>$ | $1/2^{n-1}$ | $-1+1/2^{n-1}$ | ... | $1/2^{n-1}$ | ... | $1/2^{n-1}$ | $1/2^{n-1}$ |
| ... | ... | ... | ... | ... | ... | ... | ... |
| $\|i>$ | $1/2^{n-1}$ | $1/2^{n-1}$ | ... | $-1+1/2^{n-1}$ | ... | $1/2^{n-1}$ | $1/2^{n-1}$ |
| ... | ... | ... | ... | ... | ... | ... | ... |
| $\|1..0>$ | $1/2^{n-1}$ | $1/2^{n-1}$ | ... | $1/2^{n-1}$ | ... | $-1+1/2^{n-1}$ | $1/2^{n-1}$ |
| $\|1..1>$ | $1/2^{n-1}$ | $1/2^{n-1}$ | ... | $1/2^{n-1}$ | ... | $1/2^{n-1}$ | $-1+1/2^{n-1}$ |

Grover's algorithm may be implemented in routines for searching a desired item in a set, by representing in vector form each item of the set forming an input set of vectors, and applying the Grover's algorithm to this set of vectors. The output vector represents the desired item.

The implementation of a Grover's algorithm clearly implies the calculation of several vector products. In fact, all qubits must be multiplied for matrix H, must be subjected to the entanglement operator $U_F$ and all qubits but the latter must be multiplied for matrix $D_n$.

A similar problem is present for implementing the well known Deutsch-Jozsa's quantum algorithm that is used in decision making algorithms. As it may be inferred from FIG. 4, which represent the quantum circuit of the Deutsch-Jozsa's algorithm, the gate equation is $$G=(^n H \otimes I) \cdot U_F \cdot (^{n+1}H)$$

Even if the Deutsch-Jozsa's algorithm implies a smaller number of calculations than the Grover's algorithm, its running result will be burdensome when the number n is relatively large.

Actually, these calculations are carried out by software routines, but such routines run slowly because of the large number of multiplications to be performed. For this reason, routines based on a Grover's or a Deutsch-Jozsa's algorithm need a long time to produce their output.

SUMMARY OF THE INVENTION

In view of the foregoing background, an object of the present invention to provide a quantum gate for carrying out the superposition operation of a Grover's or of a Deutsch-Jozsa's quantum algorithm. The quantum gate of the invention carries out the superposition operation in a very fast manner because it performs all multiplications by using logic gates that immediately output the result.

The superposition operation of a Grover's and of a Deutsch-Jozsa's quantum algorithm substantially includes performing the Hadamard rotation over an input set of vectors producing a set of rotated vectors, and calculating the tensor product of all the rotated vectors among them outputting a linear superposition set of vectors. The tensor product of all rotated vectors among them may be carried out by logic gates.

It has been noticed that, only for Grover's or Deutsch-Jozsa's algorithms, the components of each rotated vector may be only 1 and −1 multiplied by a scale factor. In fact, the output vectors Q of Grover's and Deutsch-Jozsa's quantum gates are given by $$Q=[(D_n \otimes I) \cdot U_F]^h \cdot Y$$

and $$Q=(^n H \otimes I) \cdot U_F \cdot Y$$

respectively, where the tensor product vector Y representing the linear superposition set of vectors is given by the following:

$$Y=[y_1, y_2 \ldots y_j \ldots y_{2^{n+1}}]$$

$$y_1=(-1)^{j+1}/2^{(n+1)/2}$$

Neglecting the scale factor $\frac{1}{2}^{(n+1)/2}$, the vector Y calculated by performing a superposition operation is formed only by two different values, thus suggesting that there could be a way for performing the multiplications by logic gates.

The method according to the invention performs the superposition operation of a Grover's or of a Deutsch-Jozsa's quantum algorithm over an input set of vectors by carrying out a Hadamard rotation of each vector of the input set producing a corresponding rotated vector. The tensor product of the rotated vectors among them is also performed by: performing the tensor product of the rotated vectors among them by encoding the component of each rotated vector with a low logic value if negative and with a high logic value if positive; ANDing all possible different pairs of components of distinct vectors producing an encoded matrix of logic components; decoding the components of the encoded matrix producing a numeric matrix; and multiplying the numeric matrix by a scale factor producing a scaled numeric matrix whose columns form the linear superposition set of vectors.

According to a preferred embodiment, the method of the invention comprises calculating a rotated vector by carrying out a dot product between a Hadamard matrix and a vector of the input set by: encoding each component of an input vector with a low logic value if null and a high logic value if non null; encoding all components of the Hadamard matrix with a high logic value; ANDing components of an input vector with corresponding components of a first and second row of the Hadamard matrix, producing first and second pairs of logic values, respectively; decoding all values of the logic sets producing two corresponding sets of numeric values; and summing the values of the first numeric pair and subtracting a second value from a first value of the second numeric pair for respectfully producing a first and a second component of a rotated vector.

BRIEF DESCRIPTION OF THE DRAWINGS

The particular aspects and advantages of the invention will become more evident through the following description of several important embodiments and by referring to the attached drawings, wherein:

FIG. 8b is a tensor product gate formed by two elementary tensor gates of FIG. 8a.

DETAILED DESCRIPTION OF THE PREFERRED EMBODIMENTS

The quantum gate of the invention is suitable for fast running decision making or data searching routines, based on the Deutsch-Jozsa's quantum algorithm or on the Grover's quantum algorithm applied over a set of input vectors. The quantum gate is composed of a superposition subsystem carrying out a linear superposition, an entanglement subsystem carrying out an entanglement operation and an interference subsystem carrying out an interference operation according to the Grover's or the Deutsch-Jozsa's quantum algorithm.

An essential characteristic of the quantum gate of the invention includes the fact that the superposition subsystem comprises logic gates for carrying out multiplications. The use of logic gates is particularly effective because of their speed in outputting a result. For this reason, the quantum gate of the invention may be conveniently used for running decision making algorithms or searching routines in a large database in a very fast manner.

For better illustrating the features of the invention, an embodiment of a quantum gate of the invention will be described for the case in which the superposition block is to carry out only the operations H|0> and H|1>. H is the Hadamard rotation matrix and |0> and |1> are the input vectors, and the tensor product of the rotated vectors are among them. Neglecting the constant factor $\frac{1}{2}^{0.5}$ of each input vector, the superposition subsystem calculates the following expression:

$$\begin{bmatrix} 1 & 1 \\ 1 & -1 \end{bmatrix}\begin{bmatrix} 1 \\ 0 \end{bmatrix} \otimes \begin{bmatrix} 1 & 1 \\ 1 & -1 \end{bmatrix}\begin{bmatrix} 1 \\ 0 \end{bmatrix} \otimes \begin{bmatrix} 1 & 1 \\ 1 & -1 \end{bmatrix}\begin{bmatrix} 0 \\ 1 \end{bmatrix} \tag{5}$$

The dot product between the Hadamard matrix and each input vector can be performed via AND gates. In fact, $$1*1=1\hat{}1=1;\ -1*1=-(1\hat{}1)=-1;\ 1*0=(1\hat{}0)=0$$

Figure 1:
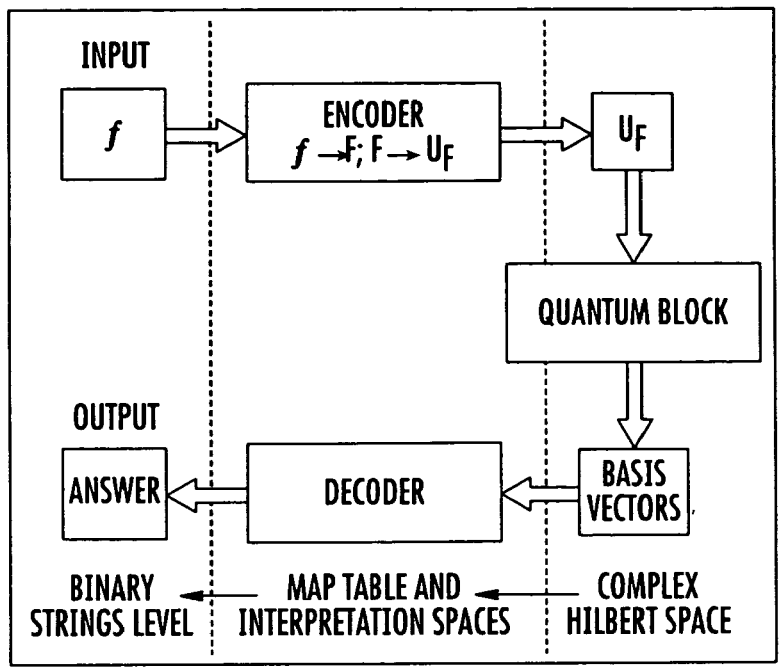
FIG. 1 is a block diagram of Quantum Algorithms according to the prior art.
Figure 2:
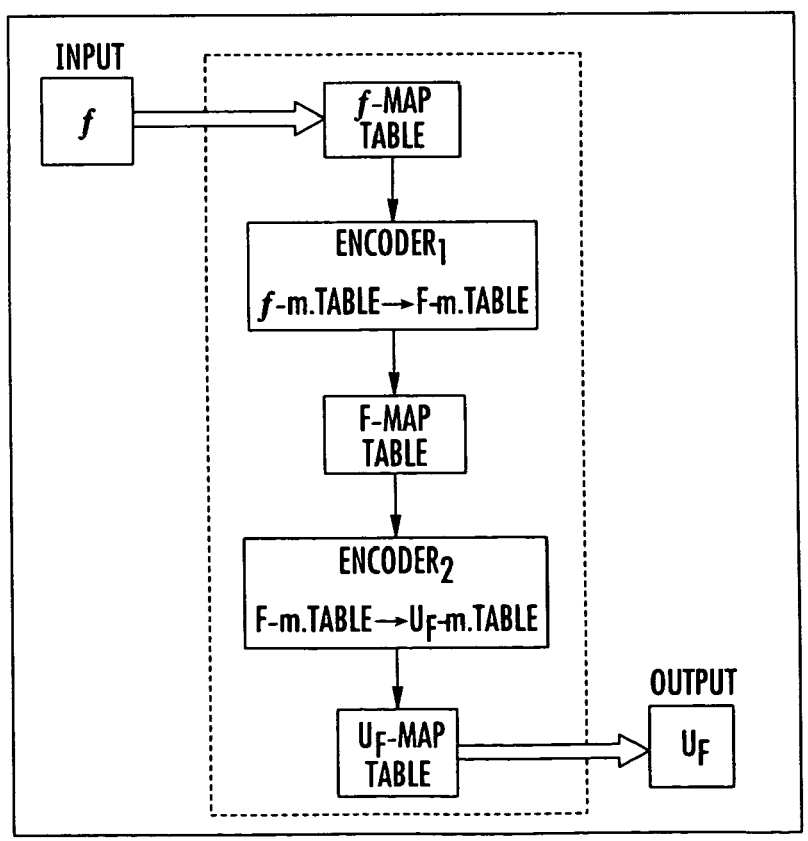
FIG. 2 is a block diagram of an Encoder according to the prior art.
Figure 3:
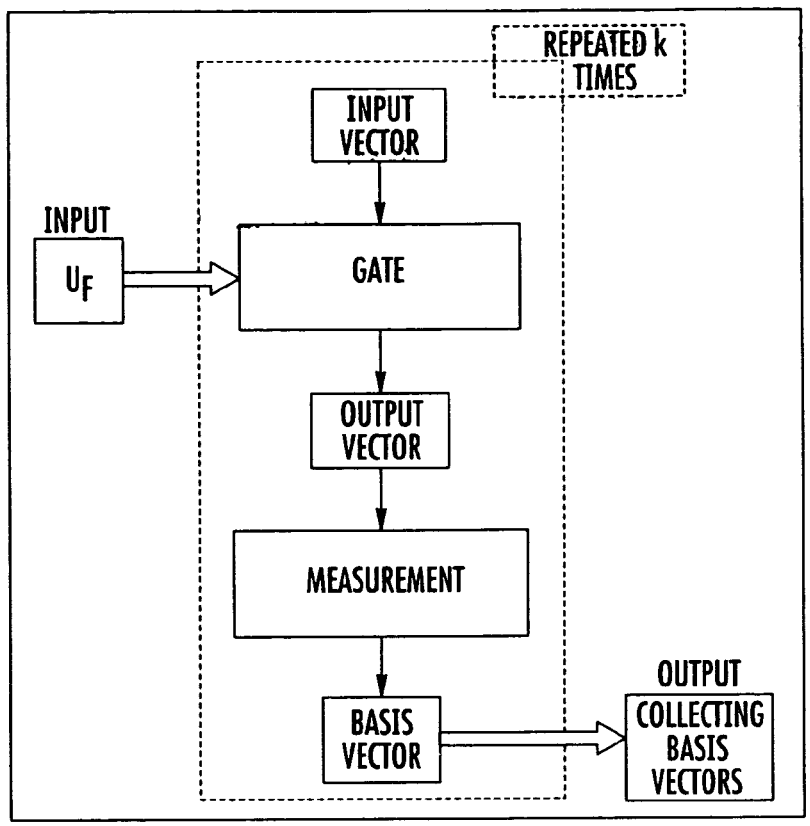
FIG. 3 is a general structure of the Quantum Block illustrated in FIG. 1.
Figure 4:
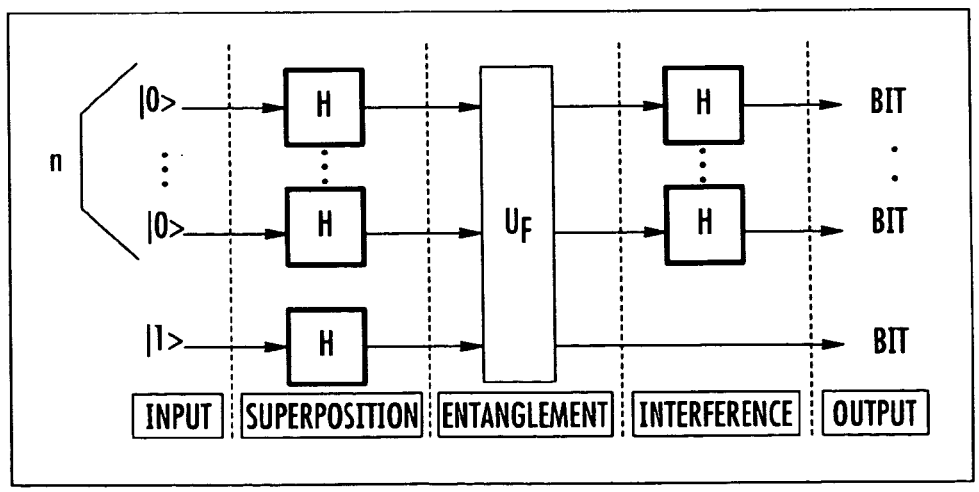
FIG. 4 is a circuit for a Deutsch-Jozsa's quantum gate according to the prior art.
Figure 5A:
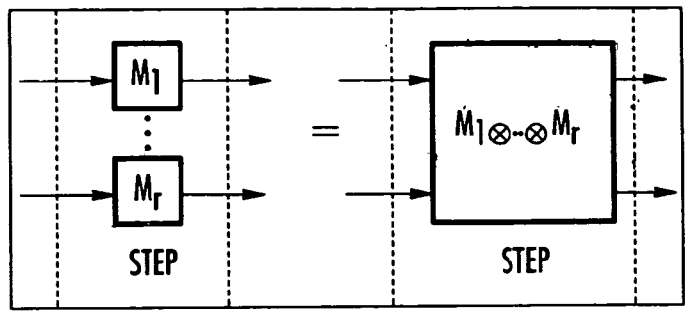
FIG. 5a shows an example of a tensor product transformation according to the prior art.
Figure 5B:
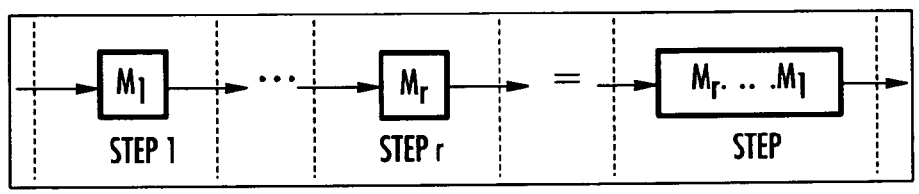
FIG. 5b shows an example of a dot product transformation according to the prior art.
Figure 5C:
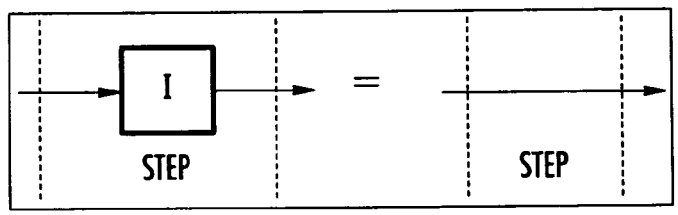
FIG. 5c shows an identity transformation according to the prior art.
Figure 5D:
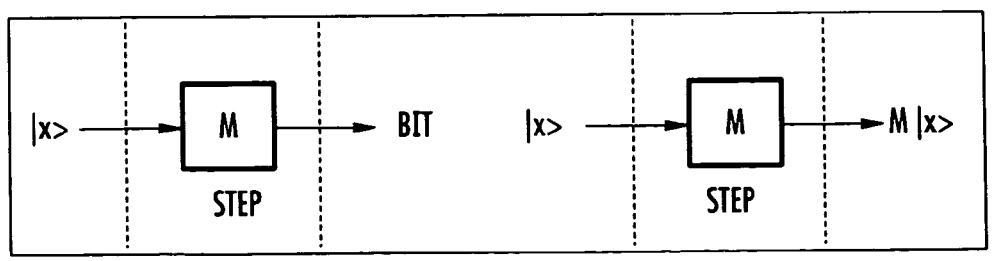
FIG. 5d shows an example of the propagation rule according to the prior art.
Figure 5E:
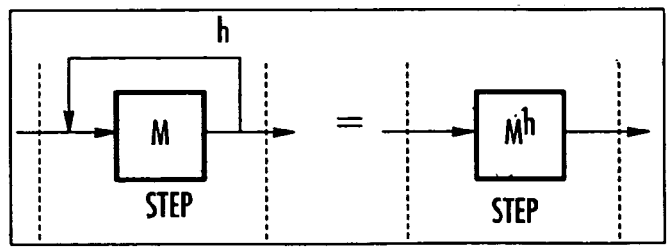
FIG. 5e shows an example of the iteration rule according to the prior art.
Figure 5F:
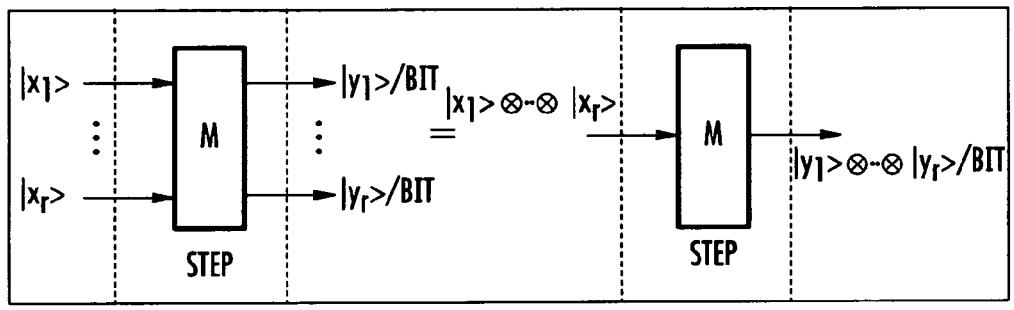
FIG. 5f explains the input/output tensor rule according to the prior art.
Figure 6:
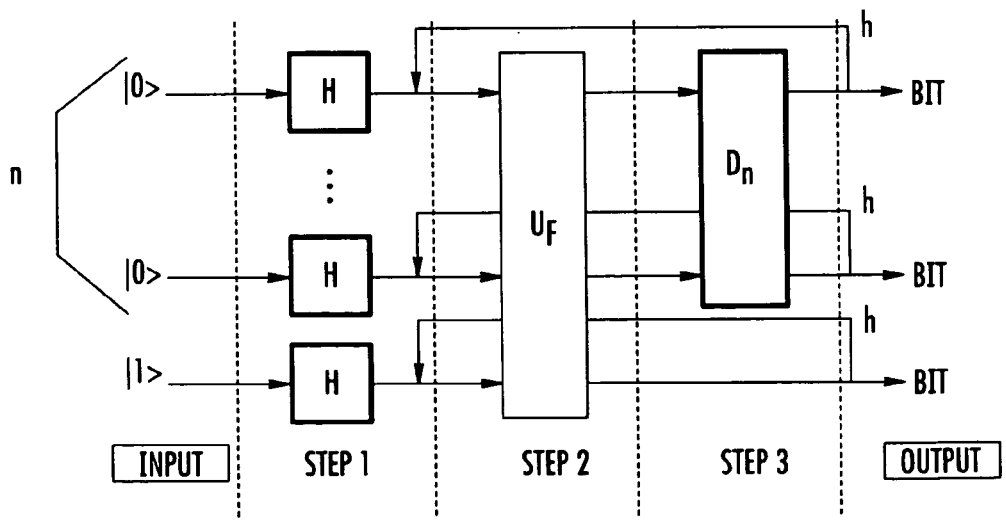
FIG. 6 is an example of a circuit forming Grover's quantum gate according to the prior art.
Figure 7A:
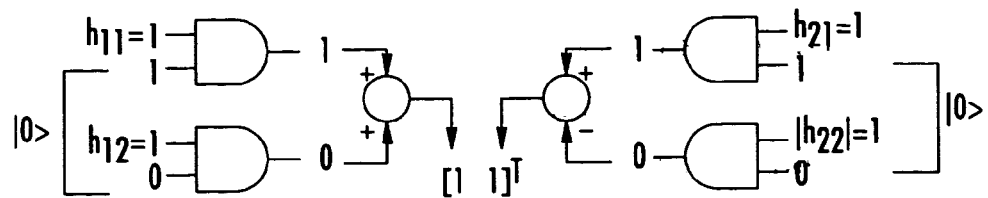
FIGS. 7a and 7b are dot product gates of the quantum gate according to the present invention.
Figure 7B:
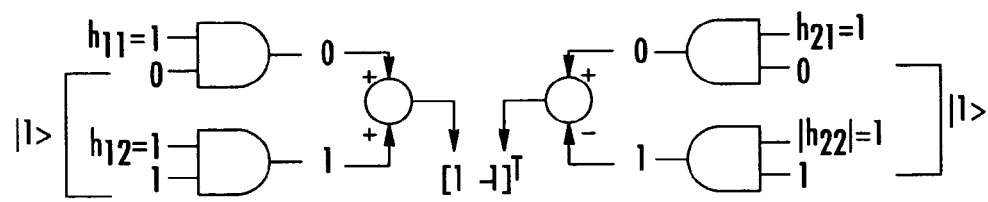

According to a preferred embodiment of the invention, the quantity H|0> may be calculated and obtained by the dot product gate depicted in FIG. 7a. Similarly, H|1> may be calculated using another dot product gate, as depicted in FIG. 7b. Such dot product gates are composed of two pairs of AND gates connected to a respective adder. Each pair of AND gates outputs the products between the components of an input vector and the components of a respective row of the Hadamard matrix. How a dot gate works is relatively straightforward by looking at FIGS. 7a and 7b.

Should the superposition block be input with a string of n+1 qubits, 4(n+1) AND gates and 2(n+1) adders would be necessary for calculating all dot products. Optionally but less conveniently, such dot products may also be performed by a software routine. In fact, the number of multiplications to be carried out for performing all dot products increases linearly with n, thus all dot products may be performed in a relatively fast manner even if n is large.

On the contrary, the number of multiplications involved by all tensor products increases exponentially with n. Therefore, it is clear that the most burdensome operation for performing a linear superposition is the tensor product of all the rotated vectors among them. The quantum gate excellently solves such a problem, as will now be described below.

Carrying out all the dot products, expression (5) becomes $$\begin{bmatrix} 1 \\ 1 \end{bmatrix} \otimes \begin{bmatrix} 1 \\ 1 \end{bmatrix} \otimes \begin{bmatrix} 1 \\ -1 \end{bmatrix} = \begin{bmatrix} 1 & -1 & 1 & -1 & 1 & -1 & 1 & -1 \end{bmatrix}^T \quad (6)$$

The result of the tensor product is formed only by 1 and −1, and thus there is the possibility of using logic gates for performing all tensor products. According to the method of the invention, each component is encoded with a high logic value 1 if positive or with a low logic value 0 if negative. The problem is thus to calculate the following tensor product:

$$\begin{bmatrix} 1 \\ 1 \end{bmatrix} \otimes \begin{bmatrix} 1 \\ 1 \end{bmatrix} \otimes \begin{bmatrix} 1 \\ 0 \end{bmatrix} \quad (7)$$

Expression (7) may be calculated by performing the rightmost tensor product, after calculating the second tensor product:

$$\begin{bmatrix} 1 \\ 1 \end{bmatrix} \otimes \left( \begin{bmatrix} 1 \\ 1 \end{bmatrix} \otimes \begin{bmatrix} 1 \\ 0 \end{bmatrix} \right) \quad (8)$$

Figure 8A:
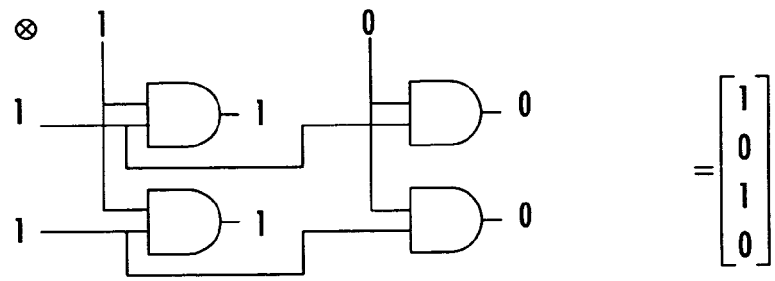
FIG. 8a is an elementary tensor product gate of the quantum gate according to the present invention.

According to an embodiment of the quantum gate of the invention, the tensor product in parenthesis may be performed by the elementary tensor product gate depicted in FIG. 8a. The tensor product may be easily carried out by ANDing paired logic components of the two logic vectors inputting the tensor gate.

Figure 8B:
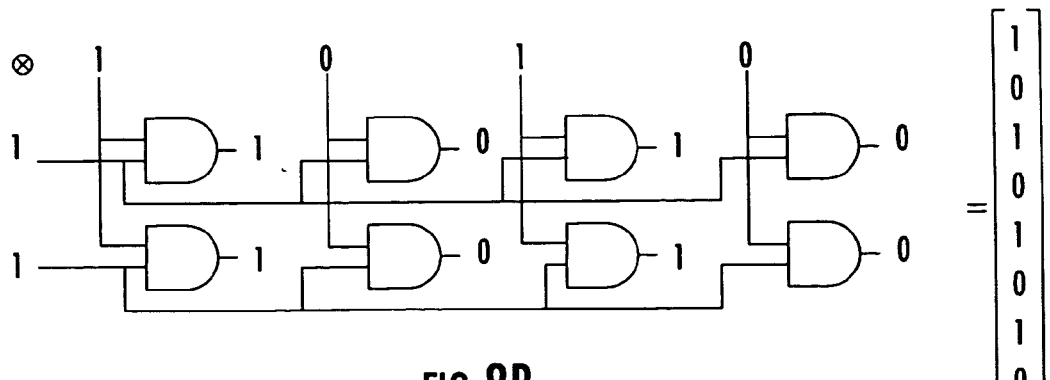

The second tensor product is performed by the tensor gate of FIG. 8b. It differs from the similar elementary tensor gate of FIG. 8a in that it has twice the number of inputs of the elementary gate. The tensor gate of FIG. 8b may be easily obtained by paralleling two elementary tensor gates. It receives an input with the logic components of the leftmost vector of expression (8) and the output of the elementary gate of FIG. 8a. A superposition subsystem of quantum gates of the invention for carrying out the tensor product (7) may be obtained simply by connecting the tensor gate of FIG. 8b in cascade to the gate of FIG. 8a.

It is evident that a quantum gate of the invention carrying out n+1 tensor products will be provided by a superposition subsystem comprising a cascade of n+1 tensor gates. The first tensor gate is an elementary gate, and all the remaining tensor gates of the cascade are formed by a number of elementary gates that is double the number of elementary gates of the preceding tensor gate in the cascade. Each tensor gate of the cascade may be easily obtained by paralleling an appropriate number of elementary tensor gates, as depicted in the example of FIG. 8b.

Therefore, the superposition subsystem of the quantum gate of the invention has a modular architecture, that is, the number of qubits may be increased at any time by simply adding other tensor gates in cascade to the latter.

The components output by the last tensor gate in the cascade are decoded by associating the value −1 to the low logic value and the value 1 to the high logic value. The resulting vector is finally multiplied for a scale factor before being subjected to the Entaglement operation. For the considered example, the scale factor of the resulting vector is the product of the three constant factors of each input vector:

$$\frac{1}{\sqrt{2}} \cdot \frac{1}{\sqrt{2}} \cdot \frac{1}{\sqrt{2}} = \frac{1}{2\sqrt{2}}$$

thus the vector output by the superposition subsystem is $$\left[ \frac{1}{2\sqrt{2}} \ -\frac{1}{2\sqrt{2}} \ \frac{1}{2\sqrt{2}} \ -\frac{1}{2\sqrt{2}} \ \frac{1}{2\sqrt{2}} \ -\frac{1}{2\sqrt{2}} \ \frac{1}{2\sqrt{2}} \ -\frac{1}{2\sqrt{2}} \right]^T$$

Alternatively, the multiplication of the resulting vector by the scale factor may be carried out preliminarily by the entanglement subsystem.

Figure 9:
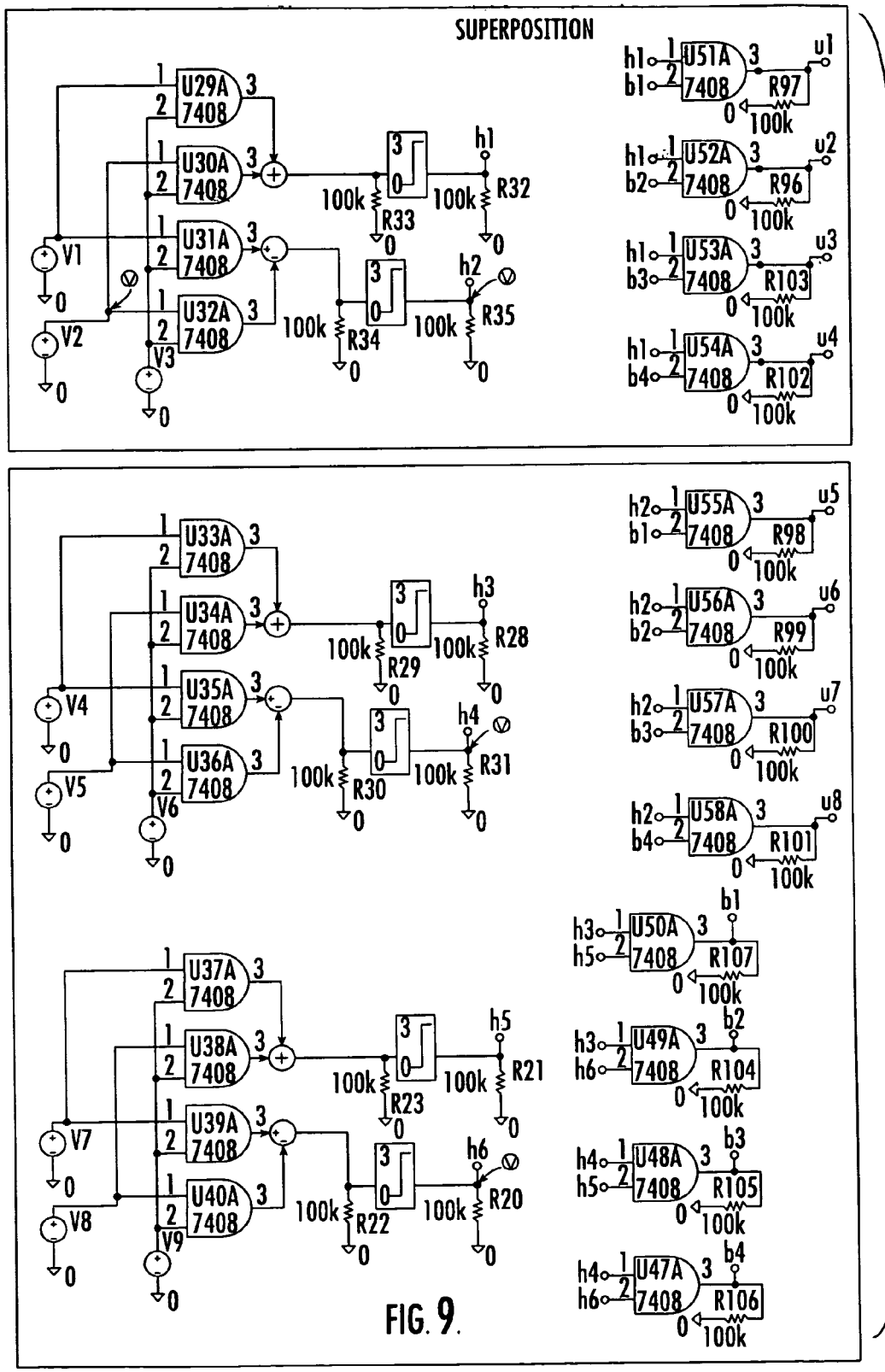
FIG. 9 is a PSPICE diagram of the superposition subsystem of a quantum gate according to the present invention.

A detailed PSPICE diagram of an embodiment of the superposition subsystem of a quantum gate of the invention, carrying out expression (5), is depicted in FIG. 9.

That which is claimed is:

1. A quantum gate for running a Grover's or a Deutsch-Jozsa's quantum algorithm over a set of input vectors, the quantum gate comprising:
   a superposition subsystem for performing a linear superposition and comprising
      N+1 matrix blocks, with each matrix block receiving a respective vector from the set of input vectors for producing a rotated vector by performing a Hadamard rotation, and
      N tensor gates connected in cascade for performing a tensor product of all the rotated vectors for producing a linear superposition set of vectors, each tensor gate comprising a plurality of logic gates for calculating components of an output matrix as products of values of all possible different pairs of components of distinct vectors, with a first tensor gate of the cascade for performing a tensor product of a pair of the rotated vectors, and all the remaining tensor gates of the cascade for performing a tensor product between a respective rotated vector and an output matrix provided by a preceding tensor gate in the cascade;
   an entanglement subsystem connected to said superposition subsystem for performing an entanglement operation; and
   an interference subsystem connected to said entanglement subsystem for performing an interference operation according to the Grover's or the Deutsch-Jozsa's quantum algorithm.

2. A quantum gate according to claim 1, wherein each tensor gate calculates the components of a respective output matrix by ANDing logic values encoding the components of a rotated vector.

3. A quantum gate according to claim 2, wherein each tensor gate comprises at least one elementary gate defined by the plurality of logic gates for performing a tensor product of a pair of input vectors of a single qubit, said plurality of logic gates comprising two pairs of logic AND gates for producing components of a respective output matrix by ANDing all possible different pairs of components of distinct vectors.

4. A quantum gate according to claim 3, wherein said first tensor gate comprises one elementary gate and all the remaining tensor gates of the cascade are formed by a number of elementary gates that is double a number of elementary gates of the receding tensor gate in the cascade.

5. A quantum gate according to claim 1, wherein each matrix block comprises a dot product gate comprising:
   a first pair of AND gates for ANDing a logic value encoding a respective component of the received input vector with a corresponding component of a first row of a Hadamard matrix for producing first logic values;
   a first adder connected to said first pair of AND gates for summing numeric values encoded by the first logic values for producing a first component of the rotated vector;
   a second pair of AND gates for ANDing a logic value encoding a respective component of the received input vector with a corresponding component of a second row of the Hadamard matrix for producing second logic values; and
   a second adder connected to said second pair of AND gates for subtracting a second numeric value from a first numeric value encoded by the second logic values for producing a second component of the rotated vector.

6. A quantum gate for running a quantum algorithm over a set of input vectors, the quantum gate comprising:
   a superposition subsystem for performing a linear superposition and comprising
      N+1 matrix blocks, with each matrix block receiving a respective vector from the set of input vectors for producing a rotated vector, and
      N tensor gates connected in cascade for performing a tensor product of the rotated vectors for producing a linear superposition set of vectors, each tensor gate comprising a plurality of logic gates for calculating components of an output matrix as products of values of possible different pairs of components of distinct vectors, with a first tensor gate of the cascade for performing a tensor product of a pair of the rotated vectors, and the remaining tensor gates of the cascade for performing a tensor product between a respective rotated vector and an output matrix provided by a preceding tensor gate in the cascade;
   an entanglement subsystem connected to said superposition subsystem for performing an entanglement operation; and
   an interference subsystem connected to said entanglement subsystem for performing an interference operation according to the quantum algorithm.

7. A quantum gate according to claim 6, wherein the quantum algorithm comprises a Grover's quantum algorithm.

8. A quantum gate according to claim 6, wherein the quantum algorithm comprises a Deutsch-Jozsa's quantum algorithm.

9. A quantum gate according to claim 6, wherein each matrix block produces the rotated vector by performing a Hadamard rotation.

10. A quantum gate according to claim 6, wherein each tensor gate calculates the components of a respective output matrix by ANDing logic values encoding the components of a rotated vector.

11. A quantum gate according to claim 10, wherein each tensor gate comprises at least one elementary gate defined by the plurality of logic gates for performing a tensor product of a pair of input vectors of a single qubit, said plurality of logic gates comprising two pairs of logic AND gates for producing components of a respective output matrix by ANDing possible different pairs of components of distinct vectors.

12. A quantum gate according to claim 11, wherein said first tensor gate comprises one elementary gate and the remaining tensor gates of the cascade are formed by a number of elementary gates that is double a number of elementary gates of the receding tensor gate in the cascade.

13. A quantum gate according to claim 9, wherein each matrix block comprises a dot product gate comprising:
   a first pair of AND gates for ANDing a logic value encoding a respective component of the received input vector with a corresponding component of a first row of a Hadamard matrix for producing first logic values;
   a first adder connected to said first pair of AND gates for summing numeric values encoded by the first logic values for producing a first component of the rotated vector;
   a second pair of AND gates for ANDing a logic value encoding a respective component of the received input vector with a corresponding component of a second row of the Hadamard matrix for producing second logic values; and
   a second adder connected to said second pair of AND gates for subtracting a second numeric value from a first numeric value encoded by the second logic values for producing a second component of the rotated vector.

14. A superposition subsystem for performing a linear superposition within a quantum gate and comprising:
   N+1 matrix blocks, with each matrix block receiving a respective vector from a set of input vectors for producing a rotated vector; and
   N tensor gates connected in cascade for performing a tensor product of the rotated vectors for producing a linear superposition set of vectors, each tensor gate comprising a plurality of logic gates for calculating components of an output matrix as products of values of possible different pairs of components of distinct vectors, with a first tensor gate of the cascade for performing a tensor product of a pair of the rotated vectors, and the remaining tensor gates of the cascade for performing a tensor product between a respective rotated vector and an output matrix provided by a preceding tensor gate in the cascade.

15. A superposition subsystem according to claim 14, wherein the quantum gate runs a Grover's quantum algorithm over the set of input vectors.

16. A superposition subsystem according to claim 14, wherein the quantum gate runs a Deutsch-Jozsa's quantum algorithm over the set of input vectors.

17. A superposition subsystem according to claim 14, wherein each matrix block produces the rotated vector by performing a Hadamard rotation.

18. A superposition subsystem according to claim 14, wherein each tensor gate calculates the components of a respective output matrix by ANDing logic values encoding the components of a rotated vector.

19. A superposition subsystem according to claim 18, wherein each tensor gate comprises at least one elementary gate defined by the plurality of logic gates for performing a tensor product of a pair of input vectors of a single qubit, said plurality of logic gates comprising two pairs of logic AND gates for producing components of a respective output matrix by ANDing possible different pairs of components of distinct vectors.

20. A superposition subsystem according to claim 19, wherein said first tensor gate comprises one elementary gate and the remaining tensor gates of the cascade are formed by a number of elementary gates that is double a number of elementary gates of the receding tensor gate in the cascade.

21. A superposition subsystem according to claim 17, wherein each matrix block comprises a dot product gate comprising:
  a first pair of AND gates for ANDing a logic value encoding a respective component of the received input vector with a corresponding component of a first row of a Hadamard matrix for producing first logic values;
  a first adder connected to said first pair of AND gates for summing numeric values encoded by the first logic values for producing a first component of the rotated vector;
  a second pair of AND gates for ANDing a logic value encoding a respective component of the received input vector with a corresponding component of a second row of the Hadamard matrix for producing second logic values; and
  a second adder connected to said second pair of AND gates for subtracting a second numeric value from a first numeric value encoded by the second logic values for producing a second component of the rotated vector.

22. A method for performing a superposition operation of a Grover's or a DEutsch-Jozsa's quantum algorithm over a set of input vectors using logic gates, the method comprising:
  performing a Hadamard rotation for each input vector for producing a rotated vector; and
  performing a tensor product of the rotated vectors for producing a linear superposition set of vectors using a plurality of tensor gates connected in cascade, each tensor gate comprising a plurality of logic gates for calculating components of an output matrix as products of values of possible different pairs of components of distinct vectors, with a first tensor gate of the cascade for performing a tensor product of a pair of the rotated vectors, and the remaining tensor gates of the cascade for performing a tensor product between a respective rotated vector and an output matrix provided by a preceding tensor gate in the cascade.

23. A method according to claim 22, wherein performing the tensor product comprises:
  encoding the components of each rotated vector with a low logic value if negative and with a high logic value if positive;
  ANDing possible different pairs of components of distinct vectors for producing an encoded matrix of logic components;
  decoding the components of the encoded matrix for producing a numeric matrix;
  multiplying the numeric matrix by a scale factor for producing a scaled numeric matrix; and
  obtaining a linear superposition set of vectors as column vectors of the scaled numeric matrix.

24. A method according to claim 22, wherein performing the Hadamard rotation comprises:
  encoding each component of an input vector with a low logic value if null and a high logic value if non-null;
  encoding components of a Hadamard matrix with a high logic value;
  ANDing components of an input vector with corresponding components of a first row of the Hadamard matrix for producing first pairs of logic values, and of a second row of the Hadamard matrix for producing second pairs of logic values;
  decoding values of the first and second pairs of logic values for producing corresponding pairs of numeric values; and
  summing values of the first numeric pair for producing a first component of a rotated vector, and subtracting a second value from a first value of the second numeric pair for producing a second component of the rotated vector.

25. A method according to claim 22, wherein each tensor gate calculates the components of a respective output matrix by ANDing logic values encoding the components of a rotated vector.

26. A method according to claim 25, wherein each tensor gate comprises at least one elementary gate defined by the plurality of logic gates for performing a tensor product of a pair of input vectors of a single qubit, the plurality of logic gates comprising two pairs of logic AND gates for producing components of a respective output matrix by ANDing possible different pairs of components of distinct vectors.

27. A method according to claim 26, wherein the first tensor gate comprises one elementary gate and the remaining tensor gates of the cascade are formed by a number of elementary gates that is double a number of elementary gates of the receding tensor gate in the cascade.

* * * * *

UNITED STATES PATENT AND TRADEMARK OFFICE
CERTIFICATE OF CORRECTION

PATENT NO. : 7,069,282 B2
APPLICATION NO. : 10/167058
DATED : June 27, 2006
INVENTOR(S) : Rizzotto et al.

It is certified that error appears in the above-identified patent and that said Letters Patent is hereby corrected as shown below:

Title Page item (30)  Delete: "Jun. 2, 2001  (EP) ............. 0830383"

Insert: -- Jun. 12, 2001  (EP) ............. 01830383 --

Signed and Sealed this

Twentieth Day of February, 2007

JON W. DUDAS
*Director of the United States Patent and Trademark Office*